United States Patent [19]

Morper et al.

[11] Patent Number: 4,664,804
[45] Date of Patent: May 12, 1987

[54] PROCESS FOR THE REMOVAL OF HEAVY METALS CONTAINED IN WASTEWATERS

[75] Inventors: Manfred Morper, Gauting; Allen Frydman, Munich, both of Fed. Rep. of Germany

[73] Assignee: Linde Aktiengesellschaft, Wiesbaden, Fed. Rep. of Germany

[21] Appl. No.: 798,153

[22] Filed: Nov. 18, 1985

Related U.S. Application Data

[63] Continuation of Ser. No. 556,866, Dec. 1, 1983, abandoned.

[30] Foreign Application Priority Data

Dec. 1, 1982 [DE] Fed. Rep. of Germany ....... 3244483

[51] Int. Cl.$^4$ .............................................. C02F 3/30
[52] U.S. Cl. .................................... 210/605; 210/624; 210/625; 210/630; 210/631; 210/912
[58] Field of Search ............... 210/601, 605, 613, 630, 210/631, 688, 702, 714, 723, 912, 913, 195.1, 195.3, 205, 207, 208, 624, 625

[56] References Cited

U.S. PATENT DOCUMENTS

| | | | |
|---|---|---|---|
| 2,364,023 | 11/1944 | Green | 210/208 |
| 2,366,898 | 1/1945 | Gurney | 210/208 |
| 2,767,847 | 10/1956 | Russell et al. | 210/208 |
| 3,129,066 | 4/1964 | Ambrogi et al. | 422/144 |
| 3,790,370 | 2/1974 | Lalancette | 210/912 |
| 4,033,763 | 7/1977 | Markels, Jr. | 210/630 |
| 4,043,936 | 8/1977 | Francis et al. | 210/912 |
| 4,293,334 | 10/1981 | Drobot et al. | 210/601 |
| 4,315,823 | 2/1982 | Witt et al. | 48/197 A |

FOREIGN PATENT DOCUMENTS

| | | | |
|---|---|---|---|
| 666060 | 4/1934 | Fed. Rep. of Germany. | |
| 2263047 | 7/1973 | Fed. Rep. of Germany. | |
| 2414521 | 10/1974 | Fed. Rep. of Germany. | |
| 857013 | 8/1981 | U.S.S.R. | 210/605 |
| 941319 | 7/1982 | U.S.S.R. | 210/601 |

OTHER PUBLICATIONS

Gould et al., "Heavy Metal Complexation Behavior In Anaerobically Digested Sludges", *WPCEJ*, Literature Review, p. 1204, Jun. 1979.
English translation of p. 1, lines 16–18 and p. 1, line 44 to p. 2, line 7 of DE-C-666,060 (Germany).
English translation of p. 11 of DE-A-2 263047 (Germany).
English translation of p. 17 of DE-A-2 414521 (Germany).
Chemical Abstracts, vol. 93, No. 22, Dec. 1, 1980, p. 331, No. 209735h, C. Versino et al.
Chemical Abstracts, vol. 95, No. 6, Aug. 10, 1981, p. 355, No. 48699y.

*Primary Examiner*—Peter Hruskoci
*Attorney, Agent, or Firm*—Millen & White

[57] ABSTRACT

A process is provided for the removal of heavy metals from wastewater prior to being fed to a wastewater treatment installation, with anaerobic sludge to cause the anaerobic sludge to absorb heavy metals in the wastewater. Thus, the heavy metals depleted wastewaters can then be treated in a conventional treatment plant and thereafter, the resultant sludge can be directly employed for agricultural purposes without requiring further treatment to remove heavy metals therein. To effect the process a preferred reactor is made up of two parts, a cylindrical mixing tank and a superposed funnel-shaped sedimentation zone.

11 Claims, 3 Drawing Figures

PROCESS FOR THE REMOVAL OF HEAVY METALS CONTAINED IN WASTEWATERS

This application is a continuation, of application Ser. No. 556,866, filed Dec. 1, 1983, now abandoned.

BACKGROUND OF THE INVENTION

This invention relates to a process and apparatus for the removal of heavy metals from wastewater being treated.

It is known that heavy metals are present in various types of wastewaters. Of the various types of wastewaters, industrial wastewaters are known to contain especially high concentrations of heavy metals.

In the prior art it is known to separate heavy metals from wastewaters from the metalworking industry by various precipitation methods, electrolysis, ion exchange, etc., so that the amount of heavy metals in these wastewaters are thereby reduced to small residual concentrations. In addition to the above, heavy metals are also found, for example, in distiller's washes of the brandy production industry, and in wastewaters from the pulp industry. In both of these instances, the wastewaters carry both an inorganic load as well as a high organic load, with the organic load containing heavy metals. As a result, the above-mentioned precipitation and other chemical purification processes are not effective since the organic load prevents heavy metals removal e.g. by buffering, complexation, competitive reactions, emulsifying properties etc. These prior art processes are discussed in the text "Wastewater Engineering" by Metcalf and Eddy; McGraw Hill 1979; pages 753–756 whose disclosure is incorporated herein by reference.

This same problem occurs when industrial wastewaters loaded with heavy metals are fed, in combination with organic-loac-carrying municipal wastewaters, to a wastewater purification/clarification plant to be processed therein, Although the organic load can be reduced, a disturbing result of the conventional methods is that there are no practical methods permitting the elimination of the heavy metals from these wastewaters carrying the high organic load. Hereinafter, the terms "purification", "treatment", or "clarification" as applied to wastewater treatment plants are intended to mean the same thing and refer to conventional municipal installations.

These heavy metals exert a deleterious influence in such wastewaters because the activated sludge, and later on, the digested sludge become enriched with the heavy metals. As a result, the heavy metal concentration in the digested sludge or in the aerobically stabilized sludge exceeds specified maximum values set by various regulations, laws, etc., then the sludge can no longer be passed directly to the agriculture industry for use in, e.g., fertilization of soil, but instead must be disposed of in other ways. Disposal of the heavy metals enriched digested sludge requires special dumps, which result in significantly higher costs than if the digested sludge is merely released directly for agricultural use.

SUMMARY OF THE INVENTION

It is thus an object of the invention to provide a process and apparatus which provides for removal of heavy metals from wastewaters, especially from highly organically loaded wastewaters.

It is another object to provide such a process and apparatus which permits removal of heavy metals from such wastewaters before they are passed to a biological wastewater purification/clarifying or treatment installation.

Upon further study of the specification and appended claims, further objects and advantages of this invention will become apparent to those skilled in the art.

These objects are attained according to the invention by contacting the wastewater with anaerobic sludge to cause absorption of the heavy metals by the anaerobic sludge, and thereafter separating the anaerobic sludge with the thus-absorbed heavy metals from the wastewater. By anaerobic sludge is meant sludge containing predominantly microorganisms the metabolism of which does not require free oxygen. These microorganisms are ubiquitous wherever organic matter is degraded with oxygen being absent. Anaerobically digested sludge from municipal digestors, with solids concentrations 1–10% is a typical example.

In the process of this invention, the capacity of anaerobic sludge to enrich itself with heavy metals, for example, copper, from the wastewater is exploited for the first time. More particularly, the high absorbing power of the anaerobic sludge provides sufficient heavy metal reduction by contacting the wastewater in this manner before being passed to the clarifying installation. This is made possible by contacting the incoming wastewater with a relatively small amount of anaerobic sludge in a reactor, thereby obtaining almost complete removal of heavy metals from the wastewater, i.e. typical residual metal concentrations below 1 mg/l or less for individual metals. The exact mechanism of the metal removal is not known, but preliminary investigations indicate that it is the result of several effects such as formation of insoluble sulfides, carbonates, hydroxides; complexation by insoluble sludge organics; metal incorporation into the biomass; filtration by the sludge, physical surface adsorption etc.

In this manner, it is possible to maintain the digested sludge or aerobically stabilized sludge produced in conventional clarifying installations substantially free of heavy metals, i.e., with metal contents below the limits set by law for various metals, making it possible to thereafter utilize this sludge for agricultural purposes, as previously discussed. The heavy metal enriched relatively smallamount of anaerobic sludge compared to the excess sludge produced in a biological wastewater treatment plant is thereafter transported to a special waste dump, or if the heavy metal concentration is sufficiently high, i.e., in the range of normally processed ores (absolute concentrations depending on the individual metal) it can be later processed for metal recovery. For metal recovery from the enriched anaerobic sludge metalurgical standard procedures are applied, the individual process depending on the specific metal to be reclaimed.

In one embodiment, it is particularly advantageous to withdraw the anaerobic sludge to be employed for heavy metal removal directly from an anaerobic sludge digestor as they are common in municipal wastewater treatment arranged downstream from the heavy metal treatment stage and to contact or react the sludge with the heavy metal containing wastewater by passing it to a heavy metal treatment sludge reactor arranged upstream of the clarifying installation.

However, since not all wastewater treatment plants include a digestion tower, in accordance with another embodiment of the invention, excess sludge from an aerobic biological clarifying installation is utilized for contacting with the wastewater carrying a heavy-metal load. This excess sludge, though being initially aerobic, activated sludge, is converted to anaerobic sludge within a short period of time by interruption of its oxygen supply. Typically, the aerobic sludge is maintained without oxygen for about 24 to 48 hours or longer, thereby permitting anaerobic organisms to grow sufficiently. Therefore, it is sufficient to design the reactor wherein the separation of the heavy metals is to be accomplished with a dual construction, i.e., two reactors. One of the two reactors is employed for the heavy metal removing reaction between anaerobic sludge and wastewater, and the other reactor is employed to convert activated sludge to anaerobic sludge. Consequently, once the anaerobic sludge in the first reactor becomes fully loaded with heavy metals, i.e., when the heavy metal concentration of the treated wastewater rises above a permitted level because the metal absorption capacity of the sludge is exhausted due to excess metal accumulation (absolute values depending on the individual metal), the flow to the first reactor is shut-off and the wastewater is fed to the second reactor to conduct heavy metal removal therein.

The heavy metals absorbed by the anaerobic sludge are in the form of various complexes, hydroxides, sulfides, or other form. To improve the retention of the heavy metals in the anaerobic sludge it is preferable if the heavy metals are present in the form of sulfides provided that insoluble sulfides of an individual metal are known. Thus, in accordance with another development of the invention, biodegradable, sulfur-containing chemicals are added to the wastewater in order to achieve improved retention. This addition takes place suitably in the form of soluble sulfides, e.g. sodium sulfide or sodium thiosulfate solutions. The amount of sulfide required depends on the concentrations of the individual sulfide forming metals. Other metal eliminations mechanisms being effective too, the sulfide requirements will always be less than stochiometric, with 20-50% of the stoichiometric values being a good approach. If the wastewater is devoid of sulfur containing compounds, addition of soluble sulfides has the advantage of immediate sulfur availability for sulfide formation. This is especially advantageous for wastewaters with low metal contents up to 2 mg/l, where short residence times up to 2 hours are common.

In accordance with still another embodiment of the invention any sulfate contained in the wastewater can be favorably exploited to increase the heavy metal retention by the sludge by increasing the reaction time between the heavy metal absorbing sludge and the incoming wastewater. More particularly, it has been found that a certain amount of degradation of the organic load by the anaerobic organisms contributes toward the reduction of higher-valency sulfur compounds into sulfides. Thus, if there is a sufficiently high sulfate concentration, i.e., equivalent to a sulfur content of the above mentioned sulfide addition, in the wastewater, the addition of biodegradable, sulfur-containing chemicals can, in certain cases, be eliminated while still maintaining a high absorption and retention of heavy metals by the anaerobic sludge.

The process of the invention can also be employed as a separate demetallizing process for use by indirect feeders, i.e., parties who discharge untreated wastewater to municipal treatment installations. Since the municipal installations require that the wastewater fed must have a heavy metals content below specified levels, the wastewater to be introduced into a waste treatment plant can be first treated by this process to lower the heavy metals content below the specified maximum values. Alternatively, the process can be part of an integrated process for use with industrial users who discharge treated wastewater directly to the environmental, i.e., direct feeder, and who have their own biologcial clarifying installation. Likewise, it can be used as a preliminary stage for existing municipal and industrial clarifying installations.

According to a special embodiment of the invention, the reaction between the wastewater containing heavy metals and the anaerobic sludge is conducted in a reactor having a funnel-shaped sedimentation zone superposed on a cylindrical mixing zone which has an agitator therein. Introduction of the wastewater containing the heavy metals, and of the sludge, is conducted in proximity to the bottom of the agitator-equipped reactor. The agitator produces a cylindrical or upwardly spiral flow whereby thorough intermixing of sludge and wastewater is effected. In the upper, conically flaring sedimentation section of the reactor, the upward velocity of the suspended sludge in the spiral flow is slowed down by the enlarging cross section of the reactor so that a zone is introduced into a cylindrical, centrally arranged mixing section having an agitator, with the sludge being also fed to this section. In these conventional sludge contact reactors, a clarifying zone is arranged concentrically around the outside of the mixing zone. The sedimented sludge is removed from the bottom of the clarifying zone by means of conventional removal devices and recycled in part into the mixing zone. In addition to these devices, conventional separate mixing and sedimentation basins can also be utilized for the process of this invention. There is no need to discuss these in detail, since they are well known to those skilled in the art.

A description of such devices can befound in "Industrie-Abwässer" by Meinck, Stoof, Kohlschlüter, Gustav Fischer Verlag, Stuttgart 1968.

The process is effective for all heavy metals, i.e., all metals with specific gravities above 4.5 g/l especially, antimony, arsenic, lead, cadmium, chromium, iron, gold, cobalt, copper, manganese, molybdenum, nickel, palladium, platinum, mercury, selenium, silver, titanium, uranium, vanadium, bismuth, tungsten, zinc, tin.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

Figure 1:
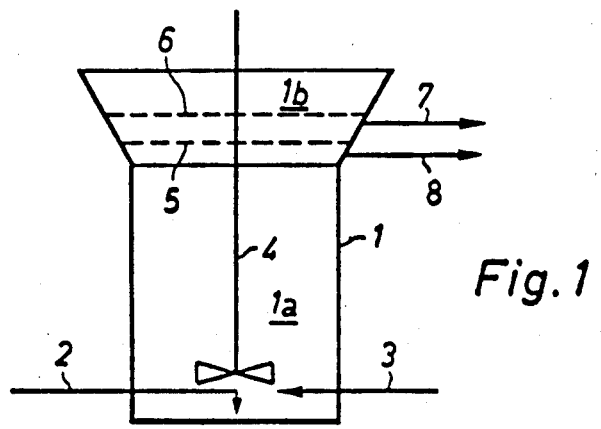
FIG. 1 is a schematic diagram of a preferred embodiment of a reactor for conducting the process of this invention.

In FIG. 1, wastewater containing heavy metals is introduced through conduit 2 into a reactor 1 having a mixing zone 1a, and a sedimentation zone 1b. Anaerobic sludge or activated sludge in the form of excess sludge is fed to the system through conduit 3. An agitator 4 is employed to produce a cylindrical, rolling or upwardly spiral flow, with dashed lines 5 and 6 denoting the sludge and water levels, respectively. Wastewater freed of heavy metals is withdrawn through conduit 7 at the top of the separation/ sedimentation zone 1b. The conduit 8 serves for the discharge of sludge laden with heavy metals. To avoid discharge of metal containing sludge along with metal depleted wastewater a minimum spacing of the maximum sludge level to the wastewater discharge level is required, similar to conventional wastewater sedimentation tanks (30–60 cm being a good approach). Conduit 8 represents the highest possible point for sludge discharge. Other positions of this conduit on the lower part are also possible, especially when sludge with good settling properties and slow stirring are applied.

This particular type of the reactor is especially adapted for use by, e.g., industrial indirect feeders who do not own a separate clarifying installation and are permitted to discharge only wastewaters having a heavy metal concentration below a predetermined maximum. Thus, this reactor is especially useful in cases where the high concentrations of heavy metals are encountered in small amounts of wastewater from such feeders.

Figure 2:
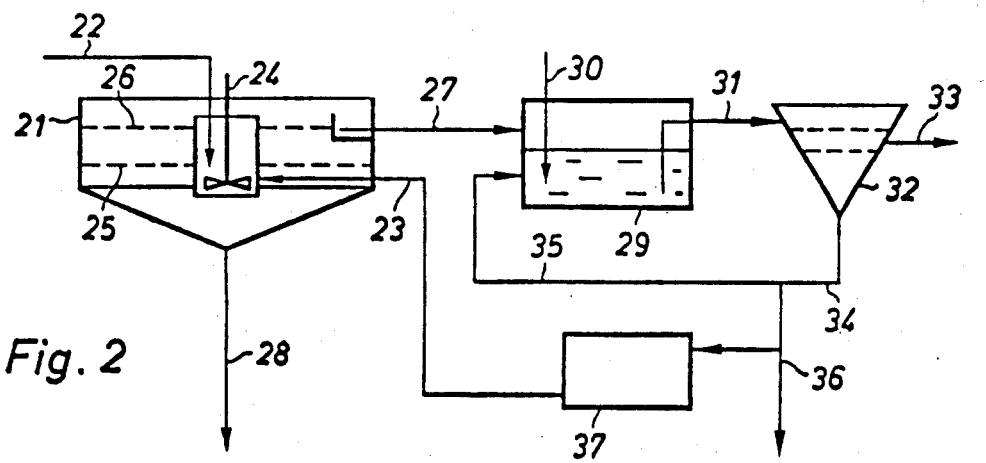
FIG. 2 is a schematic diagram of an arrangement employed in the case of an industrial direct feeder and having a biological clarifying installation and a conventional sludge contact reactor located upstream thereof.

FIG. 2 illustrates an alternative arrangement for use by, for example, an industrial direct feeder having its own internal biological clarifying installation. The wastewater containing the heavy metals is introduced into a reactor 21 through conduit 22. Anaerobic sludge is also fed into the reactor 21 through conduit 23. Agitator 24 is located in the reactor 21, and the dashed lines 25 and 26 denote the sludge level and the water level, respectively. Wastewater having a very low heavy metal content is discharged from the reactor 21 through conduit 27, while the sludge containing the heavy metals is removed periodically or continuously through conduit 28, the sludge flow depending on the heavy metal concentration in the sludge. The metal absorption capacity of the sludge must not be exceeded.

The wastewater, substantially free of heavy metals, i.e., typically with metal contents more than 90% less than before treatment, then passes into an oxygenation tank 29 to which can be fed, through conduit 30, optionally, an oxygen-containing gas or alternatively, pure oxygen. The oxygenation tank 29 is equipped in a conventional manner with oxygen circulating and oxygen supply means which, for the sake of simplicity, are not illustrated. Subsequently, the activated sludge mixture passes through conduit 31 into a post clarification tank 32 wherein the activated sludge is separated by settling from the clarified water. The clarified water is discharged from the plant through conduit 33 and the activated sludge is dischargedthrough conduit 34. A portion of the activated sludge is recycled as recycle sludge into the oxygenation tank 29 through conduit 35 while another portion is discharged through conduit 36 as excess sludge. Determining the size of the partial streams is conventional and will not be discussed further.

A portion of this excess sludge is transferred into a dwell tank 37 and left therein for about two days. Since the dwell tank 37 is sealed with respect to the atmosphere, the activated sludge is converted, within the aforementioned time period, into anaerobic sludge which is then conveyed through conduit 23 to reactor 21 to absorb heavy metals contained in the wastewater therein. This installation of FIG. 2 is especially suited for processing large quantities of wastewater, i.e., more than 500 m$^3$/d.

Figure 3:
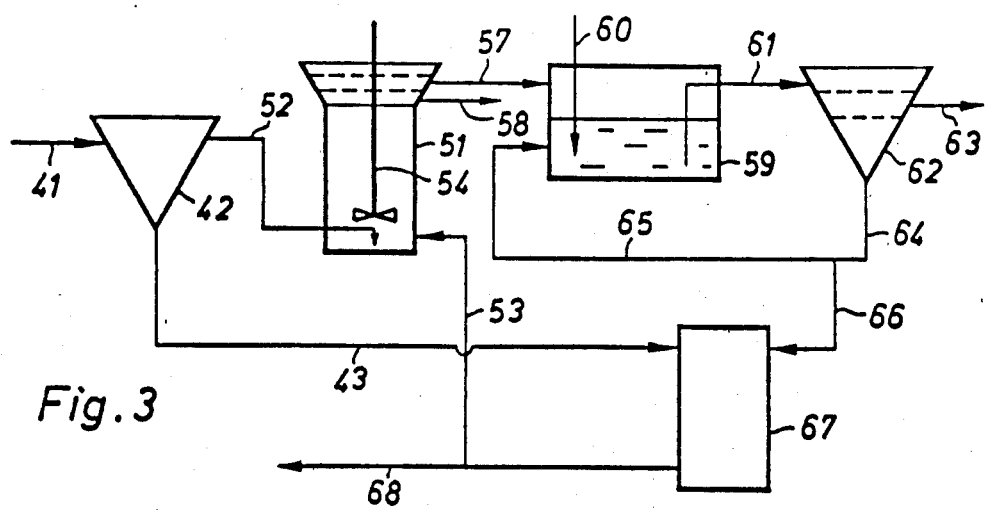
FIG. 3 is a schematic diagram of a municipal clarifying installation having a reactor according to this invention arranged upstream thereof.

FIG. 3 illustrates a municipal clarifying installation including a heavy metal elimination stage, in accordance with the invention, connected upstream thereof. Before heavy-metal-containing wastewater enters the reactor 51 through conduit 52, it is first introduced by way of conduit 41 into a preliminary clarifying tank 42 for removing sedimentable solids. The solids are conducted via conduit 43 to an anaerobic sludge digestor which will be described hereinafter. Anaerobic sludge is introduced into the reactor 51 through conduit 53, and this sludge is mixed intimately and reacted with wastewater from conduit 52 with the aid of an agitator 54. Wastewater free of heavy metals leaves the reactor 51 through conduit 57 and is passed to an oxygenation tank 59 to which can be fed, if necessary, through conduit 60, an oxygen-containing gas or alternatively, substantially pure oxygen. Sludge laden with heavy metals is discharged through conduit 58. The activated sludge mixture is passed through conduit 61 into a post-clarification tank 62 wherein the sludge is separated by settling from the clarified water. The clarified water is withdrawn through conduit 63 while the sludge is removed through conduit 64. A portion of the activated sludge is recycled into the oxygenation tank 59 via conduit 65 in a conventional manner. The excess sludge due to biomass growth, the amount of which depends on the organic load of the wastewater and on the operation conditions of the plant, is fed into a digester 67 through conduit 66. In this digester, the sludge is digested together with the solids from conduit 43 and is converted into anaerobic sludge.

The anaerobic digesters are of conventional type. Most of the bigger municipal sewage treatment plants use them for the conversion of organic matter of sewage sludges into mineralized products thereby producing a methane containing digestion gas as a valuable energy source.

The major proportion, i.e., typically 75–95%, of anaerobic sludge is withdrawn through conduit 68 and can be used, as sludge free of heavy metals, for fertilization in agriculture. A small part, i.e., typically 5–25%, is transferred into reactor 51 through conduit 53 and is employed therein to absorb heavy-metal from wastewater incoming through conduit 52. Specific sludge parameters of biological wastewater treatment plants vary within a wide range depending on type of plant, flow, organic, suspended solids content, temperature of the wastewater etc. Thus, also ratios of metal eliminating parameters relative to others can vary considerably. The below mentioned data are desired from typical wastewater situations and are not valid for all possible types of wastewaters.

In conducting the process, typically 15 to 90 days are required for absorbing metal concentrations of 10,000 to 20,000 ppm. Typically, the amount of sludge required for this concentration will be 1000 to 25,000 kg, and preferably at least 500 kg. The ratio of sludge to metals concentration required will be determined by the metal content of the wastewater and the chosen average working time of the reactor before sludge exchange. Likewise it is preferred that for a retention time in a mixing zone of 0.5 to 2 hours the sedimentation zone have surface loading of 0.5–2 m/h in accordance with conventional sedimentation devices.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following examples, all temperatures are set forth uncorrected in degrees Celsius; unless otherwise indicated, all parts and percentages are by weight.

EXAMPLE 1

| Industrial Indirect Feeder | |
|---|---|
| Wastewater introduced | 100 m$^3$/d in 10 h = 10 m$^3$/h |
| Copper content | 7 mg/l; 700 g/d |
| Copper elimination | 92%; 644 g/d |
| Copper absorption capacity of sludge | 20 g/kg TS* |
| Required reactor working period | 30 d; 19,320 g Cu to be eliminated |
| Required amount of sludge | 966 kg TS/30 d |
| Digested sludge available from municipal digestion tower | 10% TS = 100 kg/m$^3$ |
| Required amount of digested sludge | 9.7 m$^3$ |
| Permissible surface load in clarifying surface area | $Q_F$ = 0.8 m/h |
| Required clarifying surface area | 12.5 m$^2$; d = 4 m |
| Volume of mixing zone | 10 m$^3$; h = 3; F = 3.2 m$^2$; d = 2 m |
| Volume of sedimentation zone | 12.7 m$^3$ |

| Industrial Direct Feeder | |
|---|---|
| Wastewater introduced | 1000 m$^3$/d in 24 h = 41.7 m$^3$/h |
| Zinc content | 0.5 mg/l; 500 g/d |
| Zinc elimination | 90%; 450 g/d |
| Zinc absorption capacity of sludge | 20 g/kg TS |
| Required reactor working period | 60 d; 27,000 g Zn to be eliminated |
| Required amount of sludge | 1350 kg TS/60 d |
| Available thickened excess sludge from biological clarifier | 7% = 70 kg/m$^3$ |
| Required amount of sludge | 19.3 m$^3$ |

*TS is total solids

The preceding examples can be repeated with similar success by substituting the generically or specifically described reactants and/or operating condition of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the removal of heavy metals contained in waste waters comprising
   contacting incoming wastewater containing dissolved heavy metal contaminants before feeding said wastewater to a wastewater purification plant having an aerobic stage to effect organic degradation therein with an effective amount of anaerobic sludge for an amount of time sufficient to cause the anaerobic sludge to absorb heavy metal contaminants to a level no greater than the absorbing capacity of the sludge;
   separating the effective amount of anaerobic sludge having absorbed heavy metal contaminants from further contact with said wastewater before the wastewater enters the purification plant having an aerobic stage, wherein said heavy metals removal is effected by contacting the sludge with wastewater by respective feeds into a cylindrical shaped reactor including a cylindrical zone, said feeds being such that the wastewater and sludge are mixed by an effective agitator in an upwardly spiral flow into a widening sedimentation zone of the reactor superposed to the cylindrical zone, the upward flow being of a magnitude, in combination with said agitator, to provide only sufficient residence time of mixed anaerobic sludge and heavy metal containing wastewater to effect the heavy metal absorption by the sludge; wherein said widening sedimentation zone slows said upward flow thereby resulting in a separation between the sludge and the wastewater into a lower layer of sludge containing said heavy metals and an upper layer of heavy metals free wastewater, with the heavy metals containing sludge and the heavy metals free wastewater being respectively discharged from the respective layers in said widening zone; and
   passing resultant reduced in heavy metal wastewater to said wastewater purification plant to effect substantial organic degradation therein while producing an aerobic sludge.

2. A process according to claim 1, wherein the sludge for such contacting is produced as a waste product from the anaerobic treatment of the substantially metal free wastewater.

3. A process according to claim 2, further comprising adding biodegradable sulfur containing chemicals to the anaerobic sludge to enhance heavy metals absorption by the anaerobic sludge.

4. A process accoding to claim 1, further comprising producing the anaerobic sludge employed to absorb heavy metals from the excess sludge of an aerobic biological clarifying installation.

5. A process according to claim 4, further comprising adding biodegradable sulfur containing chemicals to the anaerobic sludge to enhance heavy metals absorption by the anaerobic sludge.

6. A process according to claim 1, further comprising adding biodegradable sulfur containing chemicals to the anaerobic sludge to enhance heavy metals absorption by the anaerobic sludge.

7. A process according to claim 6, wherein the biodegradable sulfur containing chemicals added are sulfides.

8. A process for the removal of heavy metals contained in wastewaters comprising
   contacting incoming wastewater containing heavy metal contaminants before feeding said wastewater to a wastewater purification plant having a biological stage to effect organic degradation therein with an effective amount of anaerobic sludge under anaerobic conditions for an amount of time sufficient to cause the anaerobic sludge to absorb heavy metal contaminants to a level no greater than the absorbing capacity of the sludge;

separating the effective amount of anaerobic sludge having absorbed heavy metal contaminants from further contact with said wastewater before the wastewater enters the purification plant having a biological stage to effect organic degradation, wherein said heavy metals removal is effected by contacting the sludge with wasterwater by respective feeds into a cylindrical shaped reactor including a cylindrical zone, said feeds being such that the wastewater and sludge are mixed by an effective agitator in an upwardly spiral flow into a widening sedimentation zone of the reactor superposed to the cylindrical zone, the upward flow being of a magnitude, in combination with said agitator, to provide only sufficient residence time of mixed anaerobic sludge and heavy metal containing wastewater to effect the heavy metal absorption by the sludge; wherein said widening sedimentation zone slows said upward flow thereby resulting in a separation between the sludge and the wastewater into a lower layer of sludge containing said heavy metals and an upper layer of heavy metals free wastewater, with the heavy metals containing sludge and the heavy metals free wastewater being respectively discharged from the respective layers in said widening zone and, passing resultant reduced in heavy metal wastewater to said wastewater purification plant to effect substantial organic degradation therein; while producing a biological surplus sludge, substantially free of heavy metal contamination.

9. A process according to claim 8, wherein the sludge for such contacting is produced as a waste product from the anaerobic treatment of the substantially metal-free wastewater.

10. A process according to claim 8, further comprising producing the anaerobic sludge employed to absorb heavy metals from the excess sludge of an aerobic biological clarifying installation.

11. A process according to claim 8, further comprising adding biodegradable sulfur-containing chemicals to the anaerobic sludge to enhance heavy metals absorption by the anaerobic sludge.

* * * * *